Figure 4:
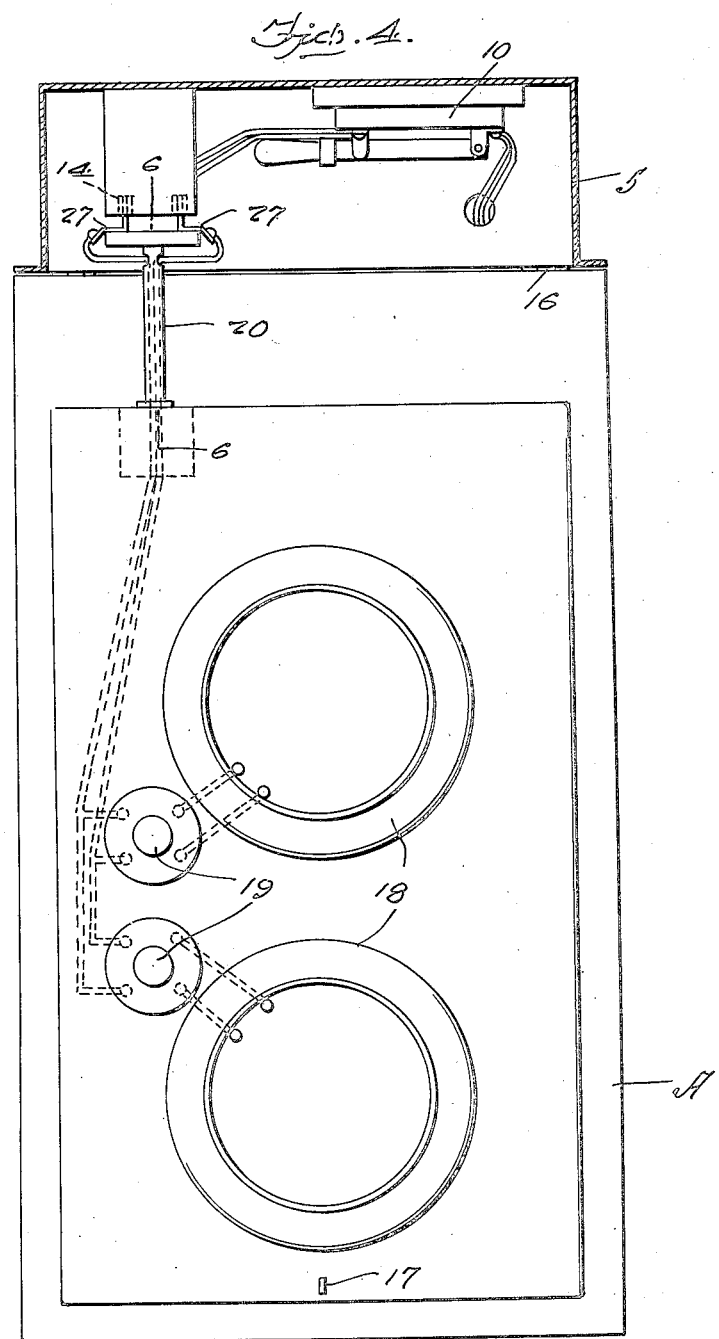

Dec. 23, 1930.    T. L. LYNAM    1,786,120
COOKING OUTFIT
Filed Nov. 12, 1928    3 Sheets-Sheet 1
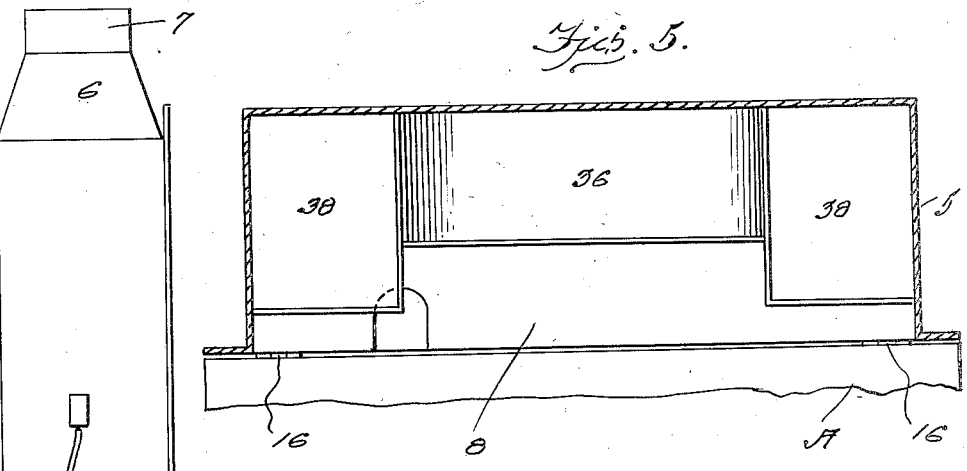
Fig. 5.
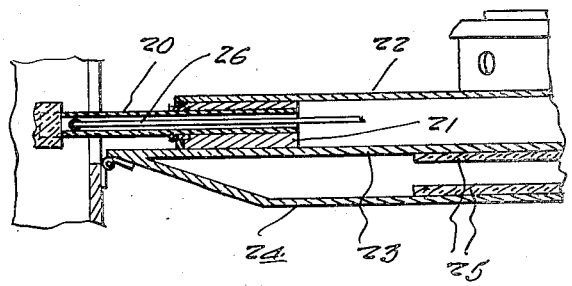
Fig. 6.
Fig. 1.
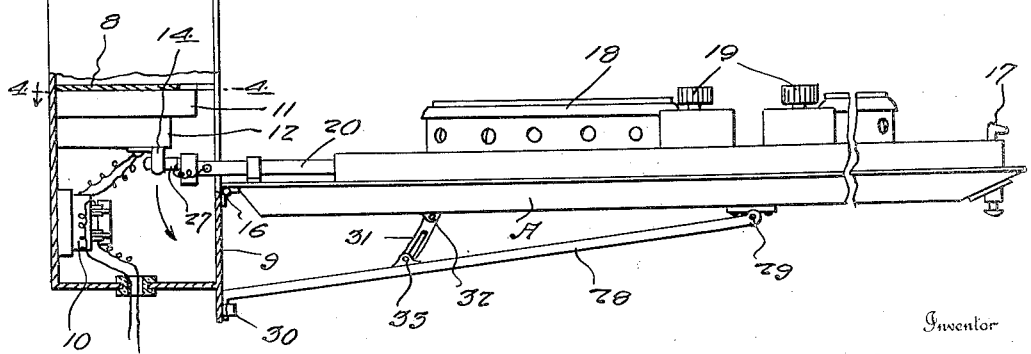
Inventor
T. L. Lynam
By Clarence A. O'Brien
Attorney

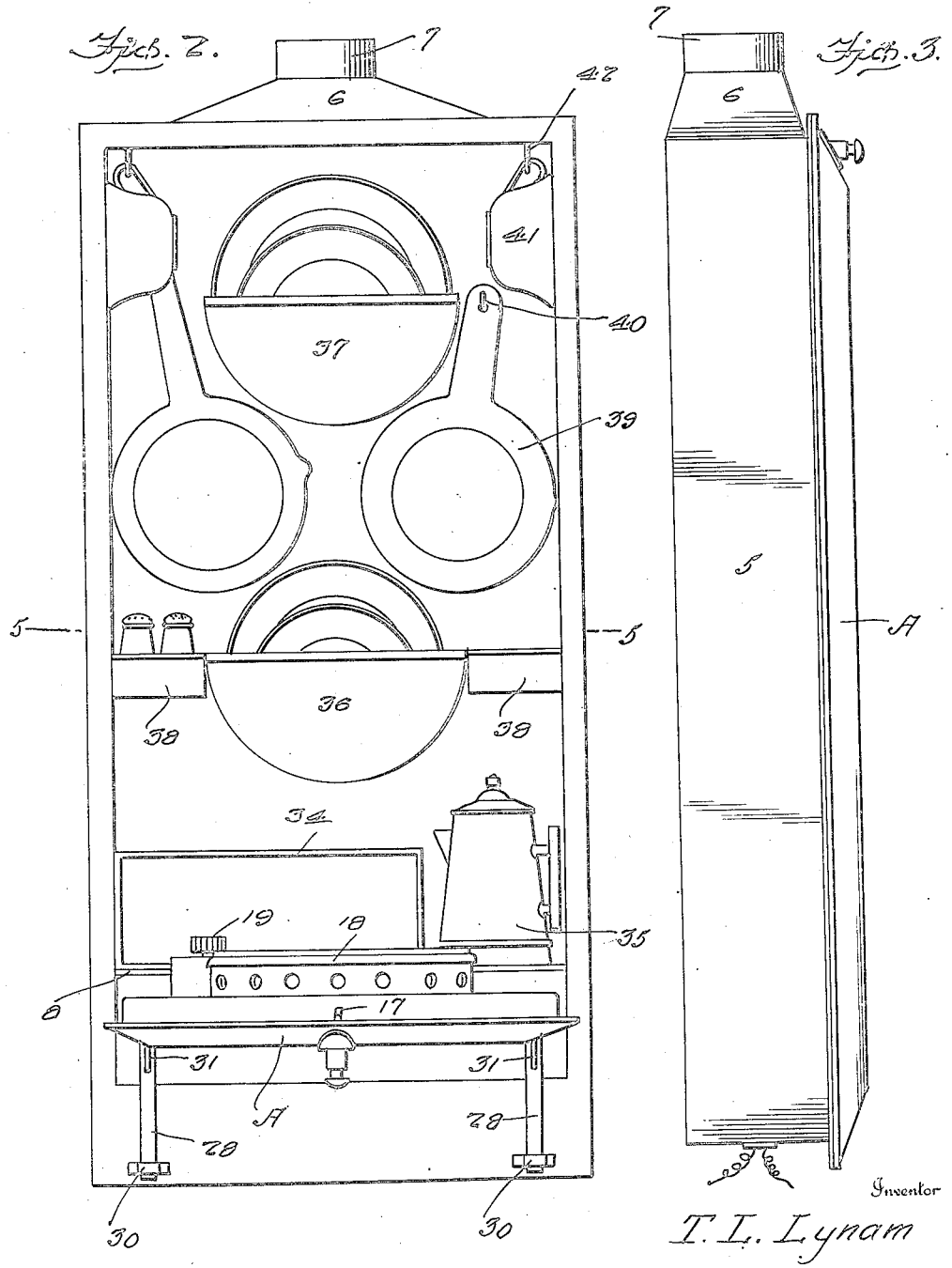

Dec. 23, 1930.  T. L. LYNAM  1,786,120
COOKING OUTFIT
Filed Nov. 12, 1928  3 Sheets-Sheet 3

Inventor
T. L. Lynam
By Clarence A. O'Brien
Attorney

Patented Dec. 23, 1930

1,786,120

UNITED STATES PATENT OFFICE

THORNTON LEWIS LYNAM, OF DARTMOUTH, MASSACHUSETTS

COOKING OUTFIT

Application filed November 12, 1928. Serial No. 318,988.

The present invention relates to a cooking outfit to be used in the wall in a kitchen or in a cabinet such as the well known Hoosier cabinet or the like and the important object of the invention resides in the provision of an outfit of this nature wherein the parts are arranged in an exceedingly compact and convenient manner wherein the structure is simple, durable and inexpensive to manufacture.

Another very important object of the invention resides in the provision of a cooking outfit of this nature which is thoroughly efficient and reliable in the use, foolproof, handy, and otherwise well adapted to the purpose for which is is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the outfit showing the door in open position and portions of the casing in section, Figure 2 is a front elevation thereof showing the door open, Figure 3 is a side elevation thereof with the door closed, Figure 4 is a horizontal section taken substantially on the line 4—4 of Figure 1, Figure 5 is a sectional view taken substantially on the line 5—5 of Figure 2, and Figure 6 is a detail section substantially on the line 6—6 of Figure 4.

Referring to the drawing in detail it will be seen that the numeral 5 denotes a casing comprising a rear wall, side walls, a bottom and a hood which is denoted specifically by the numeral 6 and tapers upwardly and terminates in a neck 7 for the purpose of carrying off vapor.

Obviously a ventilating pipe can be fitted to the neck 7 and carried up through the wall to an air vent on the outside of the house or any other place in which it might be used.

A partition 8 is disposed across the lower portion of the casing 5 and a front wall 9 partially closes this bottom compartment in which there is located a master switch 10. A block 11 is fixed to the under surface of the partition 8 and has a block of insulating material 12 fixed thereon with switch blades 14 depending downwardly therefrom.

A door A is hingedly mounted as at 16 to the upper edge of the wall 9 and at its free end is provided with a catch 17 for engaging in the top of the casing to hold the door closed.

A plurality of electric burners 18 are mounted on the inner side of the lid A and have individual control switches 19 associated therewith. Tubes 20 of insulating material extend rearwardly from blocks 21 which are disposed between the wall 22 and the inner wall 23 of the door.

The wall 22 is spaced inwardly from the wall 23. This door A includes an outer wall 24 and heat insulating material in sheet form as at 25 is disposed on the inner surfaces of these walls 23 and 24 as is clearly illustrated in Figure 6. Wiring 26 extends through the tubes 20 and is connected with knife switch blades 27 which engage between the blades 14 when the door A is in an open or horizontal position as shown in Figure 1, so that whenever the door is closed the circuit will be broken between the blades 14 and 27 even though the individual switches 19 have not been shut off thus making the structure foolproof.

A prop 28 is hingedly mounted as at 29 on the door A and engages as at 30 with the bottom of the wall 9 when the door is in an open position. A slotted brace 31 has pivotal engagement 32 with the door and a pin and slot engagement 33 with the prop.

A compartment 34 is mounted on the partition 8 for housing knives and forks or the like and a stand 35 is also mounted on this partition for supporting a coffee pot or the like. A pair of racks 36 and 37 are mounted one above the other in the casing for supporting dishes.

Racks 38 are disposed in the casing one to each side of the rack 36 and may support condiment holders or the like. Frying pans and the like may be supported on hooks 40 to the sides of the rack 37 and cups 41 may be supported on hooks 42 depending from the hood or top of the casing.

From the above detailed description it will be seen that I have devised a safe, reliable and automatic cooking equipment for lodging houses, tenements and the like. The cabinet may be placed in the walls between two upright studs and may be braced at the bottom and top so that it will remain firmly fixed in position, the idea being to have a cooking cabinet in the wall or like place so that there will be no heater disposed to view and at the same time quick access and handy to use.

When the door is shut the knife switch is thrown out of contact and automatically cuts off the electric burner. Likewise when the door is open the reverse happens, the idea being to thrown on the current automatically when the person pulls on the door but throw it off when the person closes the door. The two switches 19 are for the convenience of any one desiring to cut the units off independently as a matter of precaution or if anyone desires to use only one unit at a time.

It is thought that the construction, utility and operation and advantages of this invention will now be quite apparent to those skilled in this art without a more detail description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An apparatus of the class described including a casing, a door hingedly mounted on the casing, electric burners on the door, and means for closing a switch when the door is open and opening the switch when the door is closed, and individual switches for the burner, props for holding the door in a horizontal open position, said props being hingedly mounted to the door and having offset ends receivable in keepers on the bottom of the casing, braces pivotally engaged with the door and having pin and slot connections with the props, the door including an inner wall and an outer wall with sheets of heat insulating material secured to the inner surfaces thereof, a supplemental wall mounted on the inside of the door in spaced relation thereto for supporting the burner, and electrical conductors confined between the supplemental wall and the inner faces of the door.

In testimony whereof I affix my signature.

THORNTON LEWIS LYNAM.